(12) United States Patent
Adachi et al.

(10) Patent No.: US 7,251,397 B2
(45) Date of Patent: Jul. 31, 2007

(54) ENCODER/DECODER FOR OPTICAL CDMA

(75) Inventors: Jingo Adachi, Osaka (JP); Akihiro Itoh, Kyoto (JP); Shinichi Wakabayashi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/444,428

(22) Filed: Jun. 1, 2006

(65) Prior Publication Data

US 2006/0215956 A1    Sep. 28, 2006

Related U.S. Application Data

(63) Continuation of application No. PCT/JP2005/019776, filed on Oct. 27, 2005.

(30) Foreign Application Priority Data

Nov. 8, 2004    (JP)    ............... 2004-323353

(51) Int. Cl.
  *G02B 6/34*    (2006.01)
  *G02B 6/12*    (2006.01)
  *G02F 1/295*    (2006.01)
(52) U.S. Cl. .............. 385/37; 385/18; 385/10
(58) Field of Classification Search ........... 385/37, 385/10, 18
See application file for complete search history.

(56) References Cited

U.S. PATENT DOCUMENTS

| | | | |
|---|---|---|---|
| 5,793,907 A * | 8/1998 | Jalali et al. | 385/24 |
| 6,314,220 B1 * | 11/2001 | Mossberg et al. | 385/37 |
| 6,594,421 B1 * | 7/2003 | Johnson et al. | 385/37 |
| 6,711,313 B2 * | 3/2004 | Takiguchi et al. | 385/15 |
| 6,892,001 B2 * | 5/2005 | Ohta et al. | 385/37 |
| 2001/0010739 A1 * | 8/2001 | Takiguchi et al. | 385/15 |
| 2003/0128917 A1 * | 7/2003 | Turpin et al. | 385/24 |
| 2003/0161636 A1 * | 8/2003 | Ohta et al. | 398/166 |
| 2006/0056764 A1 | 3/2006 | Adachi et al. | |

FOREIGN PATENT DOCUMENTS

JP    2005-72868 A    3/2005

OTHER PUBLICATIONS

Habib Fathallah, et al., "Passive Optical Fast Frequency-Hop CDMA Communications System," Journal of Lightwave Technology, Mar. 1999, pp. 397-405, vol. 17, No. 3, IEEE.
Habib Fathallah, et al., "Robust Optical FFH-CDMA Communications: Coding in Place of Frequency and Temperature Controls," Journal of Lightwave Technology, Aug. 1999, pp. 1284-1293, vol. 17, No. 8.

* cited by examiner

*Primary Examiner*—K. Cyrus Kianni
(74) *Attorney, Agent, or Firm*—McDermott Will & Emery LLP

(57) ABSTRACT

An encoder according to the present invention is an encoder for encoding an optical wavelength-multiplexed signal compliant with optical CDMA into a code having a code pattern, including: L optical fibers 36 and 42 (where L is an integer equal to or greater than two) each having a plurality of gratings 37 to 47; and a circulator 52 for coupling the plurality of optical fibers 36 and 42. The code pattern contains time bins t1 to t3. A plurality of wavelengths $\lambda 1$, $\lambda 4$ and $\lambda 5$ are assigned to the time bin t1. If a sum of an optical path difference in each optical fiber from the grating which reflects the optical signal of the wavelength $\lambda 1$ to the grating which reflects the optical signal of the wavelength $\lambda 4$ is calculated for all of the optical fibers 36 and 42, the sum equals zero.

9 Claims, 11 Drawing Sheets

FIG. 1 – Prior Art
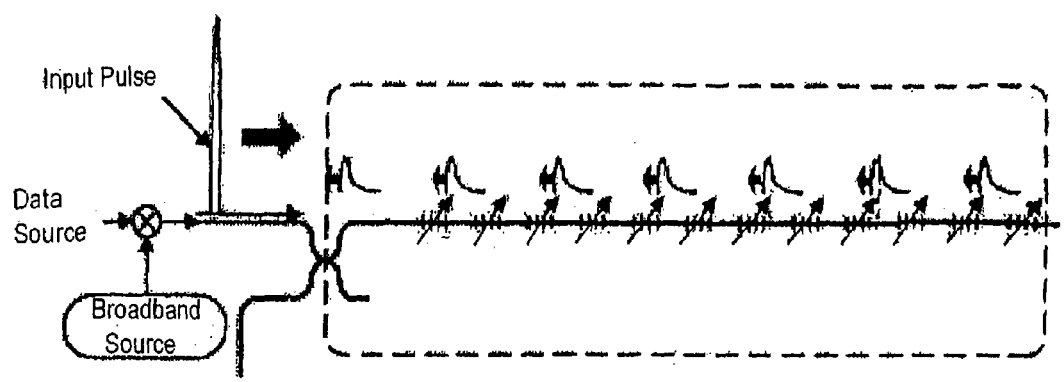
FIG. 2 – Prior Art
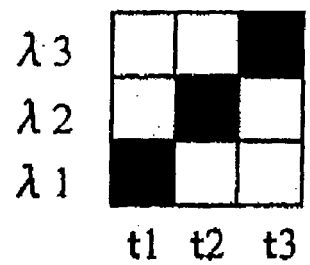
FIG. 3 – Prior Art
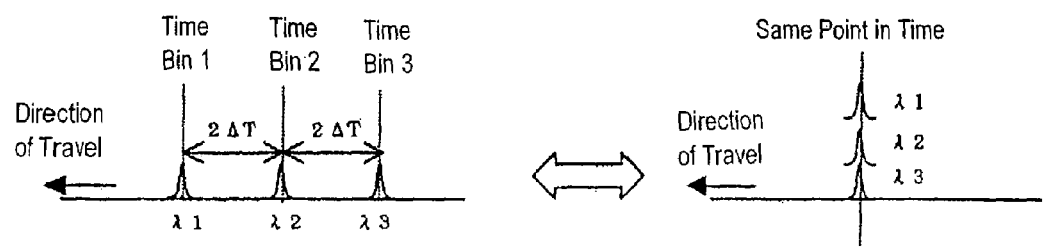

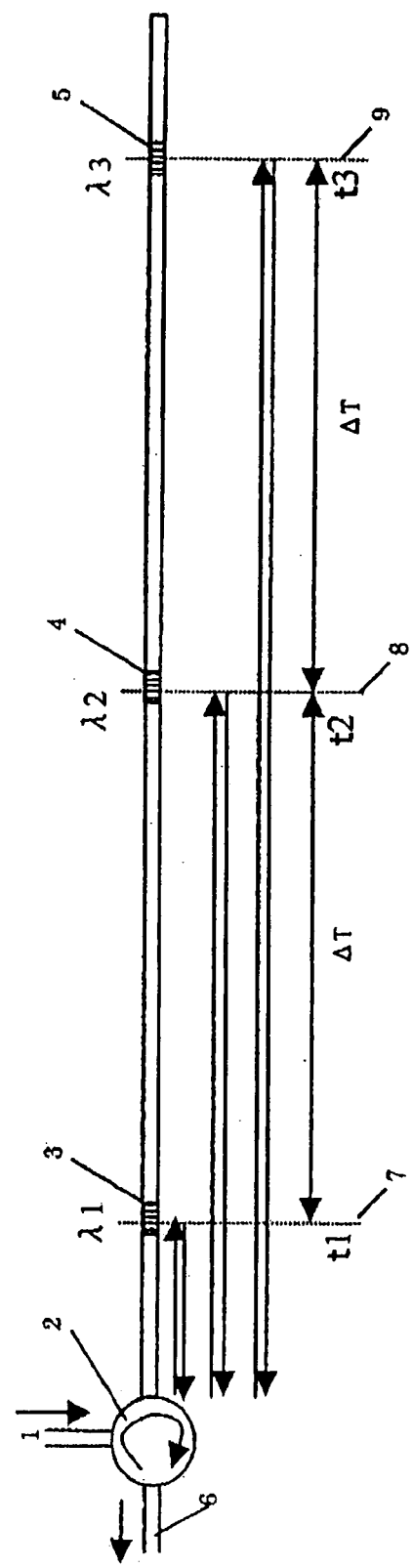
*FIG. 4 – Prior Art*

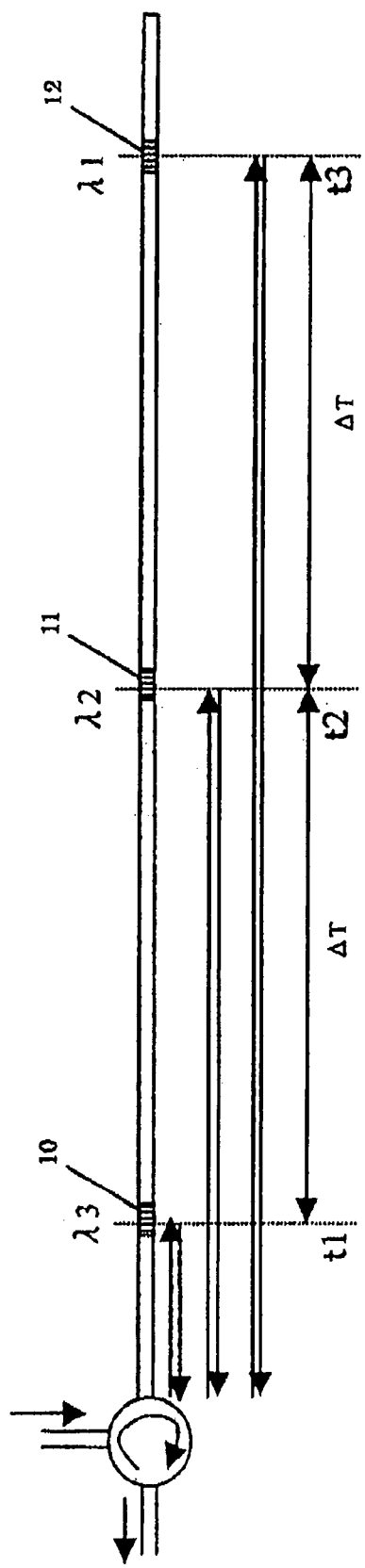
FIG. 5 – Prior Art

US 7,251,397 B2

ENCODER/DECODER FOR OPTICAL CDMA

This is a continuation of International Application No. PCT/JP2005/019776, with an international filing date of Oct. 27, 2005, which claims priority of Japanese Patent Application No. 2004-323353, filed on Nov. 8, 2004, the contents of which are hereby incorporated by reference.

BACKGROUND OF THE INVENTION

1. Field of the Invention

The present invention relates to an apparatus which performs, by optical CDMA (Optical Code Division Multiplex Access), at least one of encoding and decoding of wavelength-division-multiplexed light. More particularly, the present invention relates to an apparatus which employs optical fiber gratings to perform encoding/decoding by optical CDMA.

2. Description of the Related Art

In optical CDMA, a technique similar to the CDMA technology which has been practically used in the field of mobile communications is employed to perform encoding of an optical signal at a transmitting end, and decoding of an optical signal at a receiving end. The encoding/decoding of an optical signal is performed by using optical devices such as diffraction gratings, optical waveguides, or optical fiber gratings.

In optical CDMA, even if a number of encoded optical signals exist in the same wavelength band, interferences therebetween are prevented because of code-by-code independence. Therefore, by assigning different codes to different users, it becomes possible for a large number of users to simultaneously share one optical signal propagating medium, even though optical signals in the same wavelength band are used.

Currently proposed encoding methods can be classified into, for example: Frequency-encoding techniques; Frequency-Hopping techniques; Fast-Frequency-Hopping techniques; and direct-sequence techniques. A Frequency-encoding technique is a method of encoding which varies the intensities of optical signals for different wavelengths. A Frequency-Hopping technique and a Fast-Frequency-Hopping technique are methods of encoding which vary wavelength and delay. A direct-sequence technique is a method of encoding which varies delay and phase for a single wavelength.

An apparatus which employs optical fiber gratings to perform encoding by applying delays of sizes which are in accordance with the respective wavelengths to a light pulse signal is disclosed in: "Passive Optical Fast Frequency-Hop CDMA Communications System" Habib Fathallah, Journal of Lightwave Technology, Vol. 17, No. 3, March 1999 (hereinafter "Non-patent Document 1"); and "Robust Optical FFH-CDMA Communications: Coding in Place of Frequency and Temperature Controls" Habib Fathallah, Journal of Lightwave Technology, Vol. 17, No. 8, August 1999 (hereinafter "Non-patent Document 2").

FIG. 1 is a diagram corresponding to FIG. 1(b) of Non-patent Document 1, showing the structure of an encoder which encodes an incoming pulse. This apparatus comprises a plurality of optical fiber gratings of the same structure, each having a uniform grating. A piezoelectric device is attached to each optical fiber grating, so that different tensions can be applied to the respective optical fiber gratings.

The wavelength of reflection (hereinafter "reflection wavelength") by each optical fiber grating can be shifted by adjusting the magnitude of the tension applied thereto. As a result, light components of different wavelengths that compose the incoming pulse can be selectively reflected.

Since the optical fiber gratings are present at different positions within an optical fiber, the reflected light components will have various optical path differences, i.e., different delays. Therefore, the encoding code combination is reflected in the delay pattern.

Based on a specific combination of selected wavelengths and a combination of delays differing for each wavelength, a code pattern under the FFH-CDMA (Fast Frequency Hopping-Code Division Multiplexing Access) technique can be defined. Such a code pattern can be expressed in a matrix as shown in FIG. 2.

By controlling the magnitudes of the tensions applied to the optical fiber by means of e.g. piezoelectric devices, the reflection wavelengths can be varied, thus shifting the wavelengths which will receive specific delays. By setting the wavelengths to receive specific delays to arbitrary values, the code pattern of an encoder can be programmed. On the other hand, a decoder applies opposite delays to light of wavelengths that have been used for encoding. In other words, the order of the gratings used in the optical fiber of a decoder is a reverse of the order of the gratings used in the optical fiber of an encoder.

Hereinafter, with respect to FIGS. 2 to 5, the encoding/decoding principle used in optical CDMA will be described more specifically.

FIG. 2 shows a 3×3 matrix (Frequency-Hop pattern) corresponding to a certain code pattern. In this matrix, the horizontal axis represents time, whereas the vertical axis represents wavelength. The black blocks (elements) are time bins to which corresponding wavelengths are assigned. In the code pattern of FIG. 2, wavelengths $\lambda 1$, $\lambda 2$ and $\lambda 3$ are assigned to time bins t1, t2 and t3, respectively.

FIG. 3 schematically shows: (left side of the arrow) a light pulse sequence expressing a code which has been encoded according to the code pattern of FIG. 2; and (right side of the arrow) a light pulse whose code has been decoded. In FIG. 3, "encoding" corresponds to a conversion from the right side to the left side, whereas "decoding" corresponds to a conversion from the left side to the right side.

FIG. 4 shows an encoder which performs the encoding as shown in FIG. 3.

In the encoder shown in FIG. 4, an optical fiber in which three gratings 3, 4 and 5 are formed at a predetermined interval is coupled to optical fibers 1 and 6 via a circulator 2. A light pulse which has propagated through the optical fiber 1 passes through the circulator 2, and thereafter enters one end of the optical fiber in which the gratings 3, 4 and 5 are formed.

A light component of the wavelength $\lambda 1$ contained in this light pulse is reflected by the grating 3, and thereafter passes through the circulator 2 to enter the optical fiber 6. On the other hand, any light other than the wavelength $\lambda 1$ that is contained in the light pulse is transmitted through the grating 3. Out of the light pulse having been transmitted through the grating 3, a light component of the wavelength $\lambda 2$ is reflected by the grating 4, and thereafter passes through the circulator 2 to enter the optical fiber 6. Any light component other than the wavelength $\lambda 2$ is transmitted through the grating 4. Out of this transmitted light, a light component of the wavelength $\lambda 3$ is reflected by the grating 5, and thereafter passes through the circulator 2 to enter the optical fiber 6.

Thus, since an optical signal that has propagated through the optical fiber 1 in the form of a single light pulse is reflected by the gratings which are disposed at different positions corresponding to different wavelengths, the light pulse is separated into three light pulses on the time axis, which sequentially enter the optical fiber 6. In accordance with the structure of FIG. 4, light pulses of the wavelengths $\lambda 1$, $\lambda 2$ and $\lambda 3$ will enter the optical fiber 6 in this order; however, by changing the order in which the gratings 3, 4 and 5 are arranged, the order of the light pulses entering the optical fiber 6 can be changed. By changing the order in which the gratings 3, 4 and 5 are arranged, it becomes possible to perform encoding by different code patterns.

Axes 7, 8 and 9 shown in FIG. 4 represent the center positions of the three gratings 3, 4 and 5, respectively. The interval between the centers of the gratings 3 and 4 is the distance between the axes 7 and 8. The interval between the centers of the gratings 4 and 5 is the distance between the axes 8 and 9.

The optical path difference which exists between the light of the wavelength $\lambda 1$ and the light of the wavelength $\lambda 2$ is twice the interval between the centers of the grating 3 and the grating 4. Similarly, the optical path difference which exists between the light of the wavelength $\lambda 2$ and the light of the wavelength $\lambda 3$ is twice the interval between the centers of the grating 4 and the grating 5. Thus, the relative positioning of the gratings 3, 4 and 5 defines the time differences between the three time bins for encoding.

As shown in FIG. 4, assuming that the time (delay) required for light to propagate between the gratings 3 and 4 or between the gratings 4 and 5 is always $\Delta T$, the relative delay between light of the wavelength $\lambda 1$ and light of the wavelength $\lambda 2$ and the relative delay between light of the wavelength $\lambda 2$ and light of the wavelength $\lambda 3$ are both $2\Delta T$, as shown in FIG. 3. In other words, the axes 7, 8 and 9 shown in FIG. 4 correspond to the time bins t1, t2 and t3, respectively, the three time bins t1, t2 and t3 being respectively assigned to the wavelengths $\lambda 1$, $\lambda 2$ and $\lambda 3$.

As shown in e.g. FIG. 3, "encoding" in optical CDMA corresponds to: separating a single light pulse into a plurality of smaller pulses of light having the wavelengths $\lambda 1$, $\lambda 2$ and $\lambda 3$; and outputting these light pulses with predetermined relative delays. On the other hand, "decoding" corresponds to reassembling the plurality of light pulses which have been separated on the time axis into a single light pulse. In order to perform decoding, it is necessary to cause the light pulses (wavelengths $\lambda 1$, $\lambda 2$ and $\lambda 3$) to have opposite delays of the delays which were applied at the time of encoding, thus canceling the delays which occurred during encoding. In other words, it is necessary to synchronize the three small pulses to the same point in time, thus combining them into the same time bin. When three light pulses (wavelengths $\lambda 1$, $\lambda 2$ and $\lambda 3$) which have arrived at different points in time are synchronized to the same point in time, and detected by a detector as indicating a light intensity which is equal to or greater than a threshold value, the decoder will recognize this signal as 1 bit (the right side of FIG. 3).

When encoding data for transmission (e.g., a bit sequence which is expressed as "11001001 . . . "), the encoder sends out a light pulse sequence (wavelengths $\lambda 1$, $\lambda 2$ and $\lambda 3$) indicating the "1" bit, and does not send out a light pulse sequence indicating the "0" bit, for example. In this case, only when the aforementioned light pulse sequence has entered a decoder which is reciprocal to (i.e., provides opposite delays of) the code pattern of the encoder, the decoder will detect a signal indicating the "1" bit.

FIG. 5 shows a decoder which performs the decoding illustrated in FIG. 3. The decoder structure of FIG. 5 differs from the encoder structure of FIG. 4 in terms of the order in which the reflection wavelengths of the gratings 10, 11 and 12 are arranged. Specifically, the reflection wavelengths of the gratings 10, 11 and 12 are set to be $\lambda 3$, $\lambda 2$ and $\lambda 1$, respectively.

In an encoder having the above structure, if the reflection wavelengths of the gratings are changed due to changes in temperature or application of tension, a so-called "wavelength shift (wavelength drift)" may occur, which makes correct encoding impossible, or in the case of a decoder, makes correct decoding impossible.

A wavelength shift or wavelength drift refers to a deviation in the reflection wavelength band of a grating from its setting value, which may occur due to expansion of a grating in the encoder/decoder in response to a change in the ambient temperature, etc., or due to changes in the refractive index of the grating. In general, as the grating temperature increases, or as a greater tension is applied to the grating, the reflection wavelength band of the grating is more shifted toward the longer wavelength.

Since a code pattern is defined by a combination of a predetermined plurality of reflection wavelengths, a "wavelength shift" can cause a fatal error during encoding or decoding. For example, if a "wavelength shift" occurs in an encoder, the encoder will perform encoding by using wavelengths which are different from the wavelengths that define the intended code, thus making it impossible for the reciprocal decoder to perform decoding. Conversely, if a "wavelength shift" occurs in a decoder in the case where encoding has been performed correctly, it becomes impossible to correctly decode the code. These will induce data transmission errors or transmission failures. In order to prevent such a "wavelength shift", the gratings of an encoder/decoder are to be maintained at a constant temperature.

Non-patent Document 2 discloses a technique which prevents problems in encoding/decoding even in the presence of a slight "wavelength shift", this technique being based on the Fast-Frequency-Hopping technique. According to this technique, the number of chips in the code pattern is reduced to give a large margin to the band of each chip, whereby some immunity to non-wavelength-dependent shifts is obtained.

As used herein, a "non-wavelength-dependent shift" means a wavelength shift where the shift amount does not depend on the wavelength. On the other hand, a "wavelength-dependent shift" means a wavelength shift where the shift amount differs depending on the wavelength. A wavelength-dependent shift occurs in the case where different temperatures or different tensions are applied to the individual gratings.

Even when using the code pattern described in Non-patent Document 1, if the magnitude of the wavelength shift differs depending on the wavelength, most of the light components contained in the signal pulse light will suffer a loss and disappear. Moreover, as long as a single uniform grating is used for each chip of the code pattern, it will be difficult to provide each reflection wavelength band with a large width.

A non-wavelength-dependent shift represents a special case of a wavelength-dependent shift. That is, when the shift amounts for all wavelengths are equal in a wavelength-dependent shift, there exists a non-wavelength-dependent shift. Therefore, a non-wavelength-dependent shift is encompassed under the broad definition of a wavelength-dependent shift. This means that more stringent conditions will need to be satisfied to obtain immunity against wavelength-dependent shifts than to obtain immunity against non-wavelength-dependent shifts.

In order to overcome the problems described above, a main purpose of the present invention is to enhance immunity against wavelength-dependent shifts in an encoder and decoder compliant with optical CDMA.

SUMMARY OF THE INVENTION

An encoder according to the present invention is an encoder for encoding an optical wavelength-multiplexed signal compliant with optical CDMA into a code having a code pattern, comprising: L optical fibers (where L is an integer equal to or greater than two) each having a plurality of gratings; and a circulator for coupling the plurality of optical fibers, wherein, the code pattern contains n time bins, including time bin 1, time bin 2, ..., time bin m, ..., and time bin n (where n is an integer equal to or greater than two); the number of wavelengths assigned to a time bin m (where $1 \leq m \leq n$; m is an integer) is defined as Q(m), which is a function of m; among the Q(m) wavelengths assigned to the time bin m, a wavelength identified by an index q (where $1 \leq q \leq Q(m)$; q is an integer) is defined as $\lambda$(m, q), which is a function of m and q; and each of the L optical fibers is represented by an index s (where $1 \leq s \leq L$; s is an integer), wherein, in each optical fiber s (where $1 \leq s \leq L$), gratings respectively corresponding to the time bins m (where $1 \leq m \leq n$) are formed, and at a distant position from a position of a grating which reflects an optical signal of a wavelength $\lambda$(m, q1) corresponding to at least one time bin m included among the n time bins, another grating which belongs to the same time bin m and which reflects an optical signal of a wavelength $\lambda$(m, q2) (where $1 \leq q1 \leq Q(m)$; $1 \leq q2 \leq Q(m)$; q1≠q2; q1 and q2 are integers) different from the wavelength $\lambda$(m, q1) is formed; and in each optical fiber s, an optical path difference from the grating which reflects the optical signal of the wavelength $\lambda$(m, q1) to the other grating which reflects the optical signal of the wavelength $\lambda$(m, q2) is defined as d(m, q2, s), wherein a sum of the optical path differences d(m, q2, s) for all of the L optical fibers equals zero.

In a preferred embodiment, the reflection wavelength of at least one grating among the plurality of gratings has a continuous distribution covering a predetermined range.

In a preferred embodiment, the grating has a chirp structure.

In a preferred embodiment, the absolute value of the optical path difference (m, q2, s) in each fiber s is equal to or greater than (n−1) times a minimum pitch of the gratings in the fiber s.

A decoder according to the present invention is a decoder for decoding an optical wavelength-multiplexed signal compliant with optical CDMA, the optical wavelength-multiplexed signal having been encoded with a code pattern, comprising: L optical fibers (where L is an integer equal to or greater than two) each having a plurality of gratings; and a circulator for coupling the plurality of optical fibers, wherein, the code pattern contains n time bins, including time bin 1, time bin 2, ..., time bin m, ..., and time bin n (where n is an integer equal to or greater than two); the number of wavelengths assigned to a time bin m (where $1 \leq m \leq n$; m is an integer) is defined as Q(m), which is a function of m; among the Q(m) wavelengths assigned to the time bin m, a wavelength identified by an index q (where $1 \leq q \leq Q(m)$; q is an integer) is defined as $\lambda$(m, q), which is a function of m and q; and each of the L optical fibers is represented by an index s (where $1 \leq s \leq L$; s is an integer), wherein, in each optical fiber s (where $1 \leq s \leq L$), gratings respectively corresponding to the time bins m (where $1 \leq m \leq n$) are formed, and at a distant position from a position of a grating which reflects an optical signal of a wavelength $\lambda$(m, q1) corresponding to at least one time bin m included among the n time bins, another grating which belongs to the same time bin m and which reflects an optical signal of a wavelength $\lambda$(m, q2) (where $1 \leq q1 \leq Q(m)$; $1 \leq q2 \leq Q(m)$; q1≠q2; q1 and q2 are integers) different from the wavelength $\lambda$(m, q1) is formed; and in each optical fiber s, an optical path difference from the grating which reflects the optical signal of the wavelength $\lambda$(m, q1) to the other grating which reflects the optical signal of the wavelength $\lambda$(m, q2) is defined as d(m, q2, s), wherein a sum of the optical path differences d(m, q2, s) for all of the L optical fibers equals zero.

In a preferred embodiment, the reflection wavelength of at least one grating among the plurality of gratings has a continuous distribution covering a predetermined range.

In a preferred embodiment, the grating has a chirp structure.

In a preferred embodiment, the absolute value of the optical path difference (m, q2, s) in each fiber s is equal to or greater than (n−1) times a minimum pitch of the gratings in the fiber s.

A temperature distribution detecting apparatus according to the present invention comprises: a light source for outputting an optical wavelength-multiplexed signal; an encoder for encoding the optical wavelength-multiplexed signal, the encoder having an optical fiber in which a plurality of gratings are formed; and the decoder of the present invention for decoding the optical wavelength-multiplexed signal having been encoded by the encoder, wherein, based on a combination of reflection wavelengths of the plurality of gratings of the decoder, the temperature distribution detecting apparatus determines a temperature distribution of the positions at which the plurality of gratings of the encoders are located.

In accordance with the encoder of the present invention, a plurality of wavelengths are assigned to the same time bin so that, even if a wavelength shift or wavelength drift occurs due to fluctuations in the ambient temperature or tensions applied to the fiber, a shifted wavelength will coincide with an originally-intended wavelength. As a result, even if a wavelength shift occurs, accurate decoding at the decoder is enabled.

In accordance with the decoder of the present invention, a plurality of wavelengths are assigned to the same time bin so that, even if a wavelength shift occurs for a similar reason, accurate decoding is performed.

The encoder/decoder according to the present invention has an OR operation function, and a temperature distribution measurement apparatus can be realized by utilizing this function.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 is a schematic illustration of an optical encoder disclosed in "Passive Optical Fast Frequency-Hop CDMA Communications System" Habib Fathallah, Journal of Lightwave Technology, Vol. 17, No. 3, March 1999 ("Non-patent Document 1").

FIG. 2 is a diagram showing an example of an FFH-CDMA code pattern.

FIG. 3 is a diagram showing: a light pulse sequence as encoded in accordance with the encoding pattern of FIG. 2 (left); and a decoded light pulse (right).

FIG. 4 is a diagram showing the structure of a known encoder for performing the encoding as illustrated in FIG. 3.

FIG. 5 is a diagram showing the structure of a known decoder for performing the decoding as illustrated in FIG. 3.

DETAILED DESCRIPTION OF PREFERRED EMBODIMENTS

Hereinafter, preferred embodiments of the present invention will be described with reference to the accompanying drawings. In order to solve the problems associated with the encoder/decoder described with reference to FIGS. 4 and 5, the inventors began by studying a structure shown in FIG. 9. Therefore, prior to describing the present invention, the structure of FIG. 9 will first be discussed to facilitate the understanding of the operation principle of the encoder/decoder according to the present invention.

Figure 9:
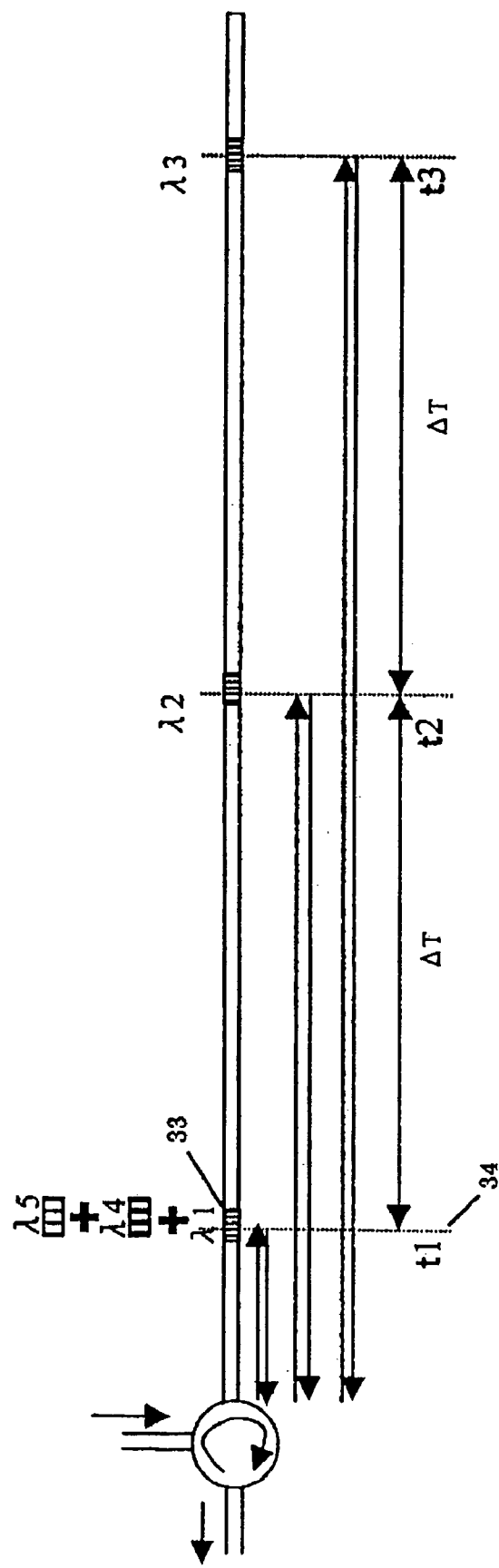
FIG. 9 is a diagram showing the structure of an encoder for performing the encoding in accordance with the encoding pattern shown in FIG. 8.

FIG. 9 shows an encoder comprising an optical fiber in which a plurality of gratings having different reflection wavelengths are formed at the same position. In the example shown in FIG. 9, two gratings, respectively having reflection wavelengths $\lambda 4$ and $\lambda 5$, are formed at the position where a grating 33 having a reflection wavelength $\lambda 1$ is formed. It is assumed that $\lambda 1+\Delta\lambda=\lambda 4$ and $\lambda 1+\Delta\lambda'=\lambda 5$.

When gratings having a plurality of reflection wavelengths are formed at the same position on an optical fiber, the plurality of wavelengths will be assigned to the same time bin. Therefore, a light pulse which is input to an encoder having the structure of FIG. 9 will assign light of the three wavelengths $\lambda 1$, $\lambda 1+\Delta\lambda$, and $\lambda 1+\Delta\lambda'$ to the same time bin t1, and thus reflect small light pulses having the three wavelengths with the same delay timing. On the other hand, when a decoder having the structure of FIG. 9 receives at least one of the light pulses of the three wavelengths $\lambda 1$, $\lambda 1+\Delta\lambda$, and $\lambda 1+\Delta\lambda'$, the delay which has been applied at the encoder is canceled, thus realizing decoding.

Now, suppose that a change in temperature or application of tension has occurred, causing a shift in the actual reflection wavelength of the grating designed for reflecting light of the wavelength $\lambda 1$ (which is assigned to the time bin t1), such that the light reflected by one of the gratings designed for reflecting light of the wavelength $\lambda 4$ and the wavelength $\lambda 5$ now has a wavelength which is substantially equal to the wavelength $\lambda 1$. In this case, three light pulses respectively reflected by the gratings designed for reflecting light of the wavelengths $\lambda 1$, $\lambda 4$ and $\lambda 5$ are input to the decoder simultaneously (i.e., within the same time bin t1). As a result, the decoder at least receives a light pulse having the wavelength $\lambda 1$ corresponding to the time bin t1 (note that this light pulse would have had the wavelength $\lambda 4$ or $\lambda 5$ if there had been no wavelength shift), thus being able to perform decoding of the code.

A decoder having the structure of FIG. 9 will be discussed. Suppose that, in this decoder, a wavelength shift has occurred in a grating having the reflection wavelength $\lambda 1$ corresponding to the time bin t1, due to a change in temperature or application of tension. If the wavelength $\lambda 1$ after the wavelength shift becomes equal to $\lambda 1+\Delta\lambda$ or $\lambda 1+\Delta\lambda'$, any one of the three light pulses to arrive at the same point in time may be reflected by the grating 33, and receive an opposite delay of the delay that has been applied during encoding. Thus, this light pulse can be successfully superposed onto light of the wavelength $\lambda 2$ corresponding to the time bin t2 and light of the light $\lambda 3$ corresponding to the time bin t3.

Thus, by assigning three different wavelengths to a single time bin, it becomes possible to perform appropriate encoding/decoding even in the presence of a wavelength shift.

Figure 8:
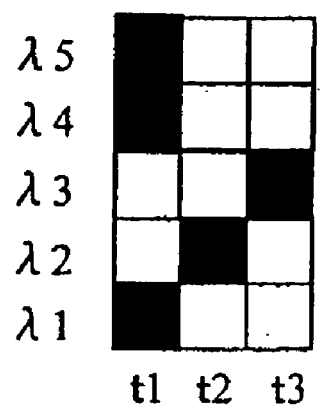
FIG. 8 is a diagram showing an exemplary code pattern in which a plurality of wavelengths are assigned to a single time bin.

FIG. 8 shows a code pattern of the apparatus of FIG. 9. The code pattern differs from the code pattern of FIG. 2 in that three wavelengths $\lambda 5$, $\lambda 4$ and $\lambda 1$ are assigned to a single time bin t1. As a result, irrespective of whether the wavelength of the light which arrives in the time bin t1 is $\lambda 1$, $\lambda 1+\Delta\lambda$, or $\lambda 1+\Delta\lambda'$, the same amount of delay will be applied to the light because they are in the time bin t1. Therefore, appropriate decoding can be performed even if an incorrect encoding has been performed due to a wavelength shift.

In order to form a grating in an optical fiber, it is necessary to periodically modulate the refractive index of a core in the optical fiber along its axial direction, this being done by irradiating the optical fiber with ultraviolet through a mask. Therefore, in order to form a plurality of gratings having different reflection wavelengths at a position in the optical fiber corresponding to a single time bin (e.g., a position indicated by an axis 34 in FIG. 9), it would be necessary to perform redundant ultraviolet irradiations for that position so as to superpose refractive index modulation structures of different periods.

However, it is extremely difficult and unpractical to form a plurality of gratings by performing redundant ultraviolet irradiations for the same position on the optical fiber because, when the refractive index of the optical fiber core is increased through ultraviolet irradiation, the refractive index will easily become saturated, which makes it difficult to superpose refractive index modulation structures of different periods. Even if the ultraviolet irradiation amount (irradiation time) is reduced for each of the plurality of superposed gratings in order to avoid saturation in terms of increase in the refractive index, each such grating will only have a small amplitude of refractive index modulation, so that only gratings having narrow reflection wavelength bands and low reflectance can be formed.

In contrast, an encoder/decoder according to the present invention comprises a plurality of optical fibers, thus making it possible to assign a plurality of different wavelengths to the same time bin, without having to superpose a plurality of gratings at the same position on the optical fiber.

In order to further facilitate the understanding of the encoder/decoder according to the present invention, with reference to FIGS. 6 and 7, it will be described how an encoding/decoding according to the code pattern of FIG. 3 can be performed by using a plurality of optical fibers.

Figure 6:
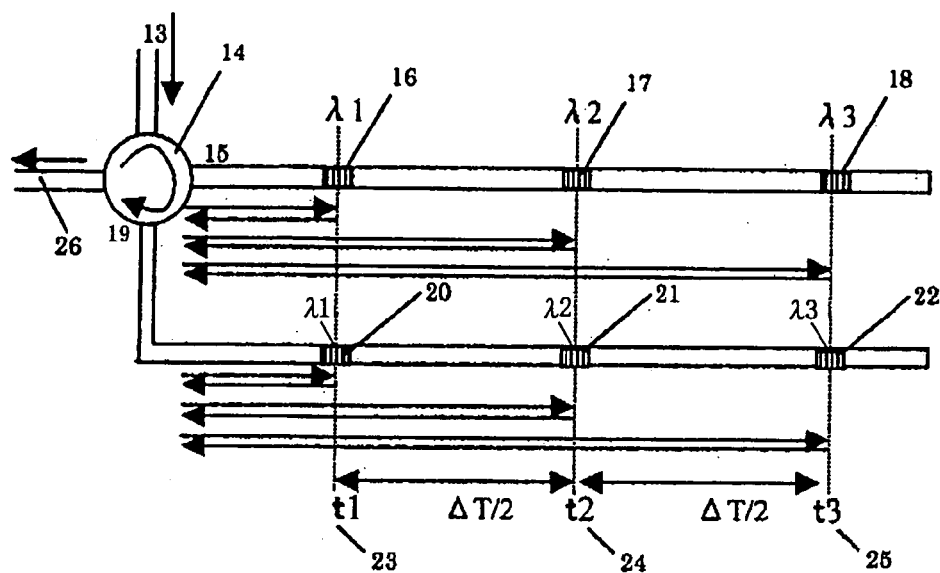
FIG. 6 is a diagram for explaining the operation principle of the encoder according to the present invention.

The encoder of FIG. 6 includes: a first optical fiber 15 in which three gratings 16, 17 and 18 are formed with a predetermined interval; and a second optical fiber 19 in which three gratings 20, 21 and 22 are formed with the same interval as the aforementioned predetermined interval. The first and second optical fibers 15 and 19 are coupled to optical fibers 13 and 26 via a circulator 14. Light which has been reflected by the gratings 16, 17 and 18 of the first optical fiber 15 enters the second optical fiber 19 via the circulator 14. The light which has been reflected from the gratings 20, 21 and 22 of the second optical fiber 19 enters the optical fiber 26 via the circulator 14. The interval between the gratings in the optical fibers 15 and 19 is half of the interval between the gratings in the apparatus shown in FIG. 4.

FIG. 6 shows axes 23, 24 and 25 each indicating the same time bin. In this example, wavelengths $\lambda 1$, $\lambda 2$ and $\lambda 3$ are respectively assigned to the three time bins.

As shown in FIG. 6, the relative positioning of the gratings 16, 17 and 18 in the first optical fiber 15 is identical to the relative positioning of the gratings 20, 21 and 22 in the second optical fiber 19. As long as this relationship is satisfied, the distance from the circulator 14 to the grating 16 corresponding to the wavelength $\lambda 1$ may be different from the distance from the circulator 14 to the grating 20 corresponding to the wavelength $\lambda 1$.

Since the interval between the gratings is half of that shown in FIG. 4, the time required for a light pulse to propagate through each optical fiber section is expressed as $\Delta T/2$. However, since the light pulse will sequentially propagate through both optical fibers 15 and 19, the light pulse will receive a relative delay of $\Delta T/2 \times 2 \times 2 = 2\Delta T$. This point will be specifically described below.

First, a light pulse which has propagated through the optical fiber 13 passes through the circulator 14 to enter the optical fiber 15. Thereafter, light of the wavelengths $\lambda 1$, $\lambda 2$ and $\lambda 3$ is respectively reflected by the gratings 16, 17 and 18 to return to the circulator 14. At this point, the light pulse of the wavelength $\lambda 2$ has been delayed by a time equal to $\Delta T/2 \times 2 = \Delta T$ relative to the light pulse of the wavelength $\lambda 1$. Similarly, the light pulse of the wavelength $\lambda 3$ has been delayed by a time equal to $\Delta T/2 \times 2 = \Delta T$ relative to the light pulse of the wavelength $\lambda 2$.

The sequence of light pulses which have returned to the circulator 14 next moves into the second optical fiber 19. Since similar delays also occur in the optical fiber 19, the light pulse of the wavelength $\lambda 2$ will have been delayed by a time equal to $\Delta T \times 2 = 2\Delta T$ relative to the light pulse of the wavelength $\lambda 1$ at the end. Similarly, the light pulse of the wavelength $\lambda 3$ will have been delayed by a time equal to $\Delta T \times 2 = 2\Delta T$ relative to the light pulse of the wavelength $\lambda 2$ at the end. As a result of this, the same encoding as that illustrated in FIG. 3 takes place.

Figure 7:
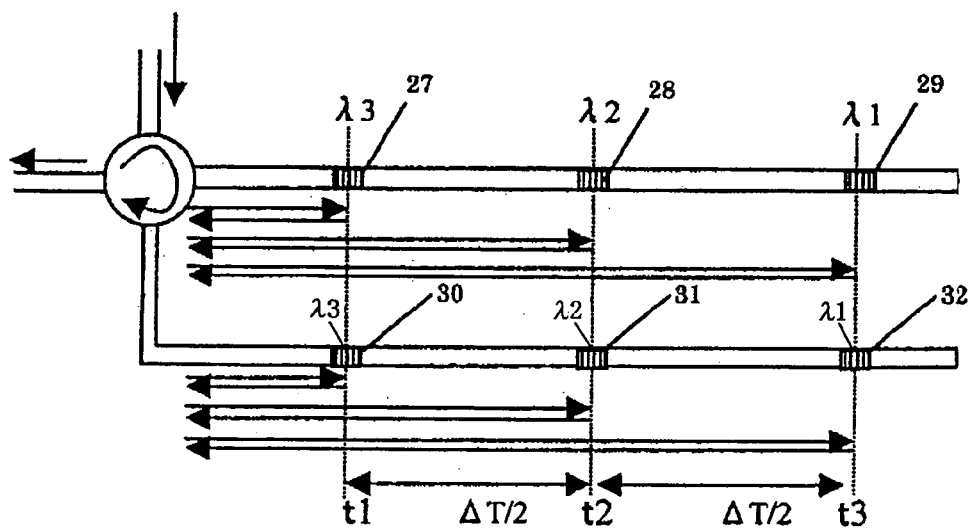
FIG. 7 is a diagram for explaining the operation principle of the encoder according to the present invention.

FIG. 7 shows a decoder which is reciprocal to the encoder of FIG. 6. In the first optical fiber of the decoder of FIG. 7, from the incident light side, a grating 27 corresponding to the wavelength $\lambda 3$, a grating 28 corresponding to the wavelength $\lambda 2$, and a grating 29 corresponding to the wavelength $\lambda 1$ are arranged. Similarly in the second optical fiber, from the incident light side, a grating 30 corresponding to the wavelength $\lambda 3$, a grating 31 corresponding to the wavelength $\lambda 2$, and a grating 32 corresponding to the wavelength $\lambda 1$ are arranged. In a decoder having this structure, the same decoding as that illustrated in FIG. 3 takes place.

In the present invention, the above-described encoder/decoder is further improved so that a plurality of wavelengths are assigned to at least one time bin, thus providing enhanced immunity against wavelength shifts.

Embodiment 1

Hereinafter, preferable embodiments of the encoder according to the present invention will be described.

Figure 10:
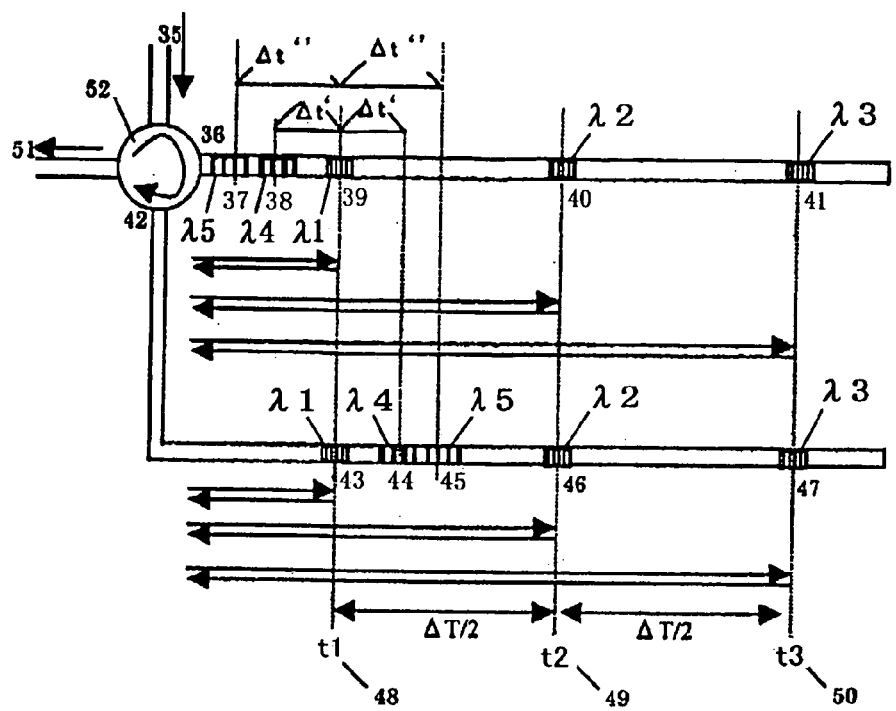
FIG. 10 is a diagram showing the structure of an encoder/decoder according to Embodiment 1 of the present invention.

First, FIG. 10 will be referred to. An encoder shown in FIG. 10 is able to perform an encoding according to the code pattern shown in FIG. 8. In other words, a plurality of wavelengths $\lambda 1$, $\lambda 4$ and $\lambda 5$ are assigned to a time bin t1.

In FIG. 10, an axis 48 indicates a position corresponding to a time bin t1; an axis 49 indicates a position corresponding to a time bin t2; and an axis 50 indicates a position corresponding to a time bin t3. The axis 48 crosses gratings 39 and 43 corresponding to a wavelength $\lambda 1$; the axis 49 crosses gratings 40 and 46 corresponding to a wavelength $\lambda 2$; and the axis 50 crosses the gratings 41 and 47 corresponding to a wavelength $\lambda 3$. Each interval between the axes 48, 49 and 50 constitutes an optical path difference corresponding to a time difference of $\Delta T/2$. Therefore, as light travels back and forth over each interval, the light receives a delay of $\Delta T$.

The encoder of FIG. 10 has a major difference from the encoder of FIG. 6 in that, in order to assign a plurality of wavelengths to the time bin t1, gratings 38 and 44 corresponding to a wavelength $\lambda 4$ and gratings 37 and 45 corresponding to a wavelength $\lambda 5$ are provided. Among the gratings corresponding to the plurality of wavelengths that are assigned to the same time bin t1, the gratings 39 and 43 corresponding to the wavelength $\lambda 1$ are on the axis 48. On the other hand, the gratings 38 and 44 corresponding to the wavelength $\lambda 4$ are shifted by distances corresponding to time periods $\Delta t'$ and $-\Delta t'$ toward the left and the right, respectively, from the axis 48. Although of the opposite signs, the shift amounts $\Delta t'$ and $-\Delta t'$ have the same absolute value. Similarly, the gratings 37 and 45 corresponding to the wavelength $\lambda 5$ are shifted by distances corresponding to time periods $\Delta t''$ and $-\Delta t''$ toward the left and the right, respectively, from the axis 48. Although of the opposite signs, the shift amount $\Delta t''$ and $-\Delta t''$ have the same absolute value.

A total delay time (delay time with respect to the light pulse of the wavelength $\lambda 1$) of the light pulse of the wavelength $\lambda 4$ having been sequentially reflected by the grating 38 in a first optical fiber 36 and by the grating 44 in a second optical fiber 42 is $(-\Delta t') \times 2 + \Delta t' \times 2 = 0$. In other words, the light pulse of the wavelength $\lambda 4$ enters the optical fiber 51 simultaneously with the light pulse of the wavelength $\lambda 1$, thus being assigned to the time bin t1. The same is also true of the wavelength λ5. Thus, it can be seen that, in accordance with the encoder of FIG. 10, an encoding similar to that performed by the encoder of FIG. 9 can be realized without having to form a plurality of gratings of different reflection wavelengths at the same position on an optical fiber.

Hereinafter, the operation of the encoder of FIG. 10 will be described more specifically.

First, a light pulse which has propagated through an optical fiber 35 enters the first optical fiber 36 via a circulator 52. In the first optical fiber 36, light pulses of the wavelengths λ5, λ4, λ1, λ2 and λ3, which are contained in the incoming light pulse, are reflected by the gratings 37, 38, 39, 40 and 41, respectively. The timing (relative delay) with which the light pulse of each of the aforementioned wavelengths returns to the circulator 52 after being reflected is determined by the relative distances between the gratings in the first optical fiber 36.

The grating 37 corresponding to the wavelength λ5 is positioned "before" the grating 39 corresponding to the wavelength λ1, by a distance corresponding to a time delay of −Δt″. Therefore, the light pulse of the wavelength λ5 enters the second optical fiber 42 earlier than the light pulse of the wavelength λ1, by a difference corresponding to the time delay of −Δt″×2.

The grating 38 corresponding to the wavelength λ4 is positioned "before" the grating 39 corresponding to the wavelength λ1, by a distance corresponding to a time delay of −Δt′. Therefore, the light pulse of the wavelength λ4 enters the second optical fiber 42 earlier than the light pulse of the wavelength λ1, by a difference corresponding to a time delay of −Δt′×2.

The grating 40 corresponding to the wavelength λ2 is positioned "after" the grating 39 corresponding to the wavelength λ1 (which is assigned to the time bin t1), by a distance corresponding to a time delay of ΔT/2. Therefore, the light pulse of the wavelength λ2 enters the second optical fiber 42 with a delay of ΔT/2×2=ΔT from the light pulse of the wavelength λ1. Similarly, the light pulse of the wavelength λ3 enters the second optical fiber 42 with a delay of ΔT×2=2ΔT from the light pulse of the wavelength λ1.

The light pulses of the wavelengths λ1, λ4, λ5, λ2 and λ3, having entered the second optical fiber 42 with different timings, are reflected by the gratings 43, 44, 45, 46 and 47, respectively. In other words, the light pulse of the wavelength λ1 is reflected by the grating 43, thus being assigned to the time bin t1; the light pulse of the wavelength λ4 is reflected by the grating 44, with a delay of Δt′ from the light pulse wavelength λ1; and the light pulse of the wavelength λ5 is reflected by the grating 45, with a delay of Δt″ from the light pulse of the wavelength λ1.

The light pulse of the wavelength λ2 is reflected by the grating 46, thus being assigned to the time bin t2. On the other hand, the light pulse of the wavelength λ3 is reflected by the grating 47, thus being assigned to the time bin t3.

Thus, the light pulse of the wavelength λ5 enters the optical fiber 51 with a delay of 2×(−Δt″)+2×Δt″=0 from the light pulse of the wavelength λ1. The light pulse of the wavelength λ4 enters the optical fiber 51 with a delay of 2×(−Δt′)+2×Δt′=0 from the light pulse of the wavelength λ1. The light pulse of the wavelength λ2 enters the optical fiber 51 with a delay of 2×ΔT/2+2×ΔT/2=2ΔT from the light pulse of the wavelength λ1. The light pulse of the wavelength λ3 enters the optical fiber 51 with a delay of 2×ΔT+2×ΔT=4ΔT from the light pulse of the wavelength λ1.

As is clear from the above description, the three wavelengths of λ1, λ4 and λ5 are assigned to the time bin t1, whereas the wavelengths λ2 and λ3 are assigned to the time bins t2 and t3, respectively.

In accordance with the encoder of FIG. 10, it is possible to assign a plurality of wavelengths to the same time bin, without having to form gratings of different reflection wavelengths at the same position on an optical fiber. By assigning a plurality of wavelengths to the same time bin, an enhanced immunity against wavelength shifts can be provided.

Embodiment 2

Next, with reference to FIG. 12, other embodiments of the encoder/decoder according to the present invention will be described.

In Embodiment 1, a group of discrete wavelengths (e.g., λ1, λ4 and λ5) are assigned to the same time bin. In the present embodiment, it is possible to assign a predetermined continuous range of wavelengths (wavelength band) to the same time bin.

Figure 11:
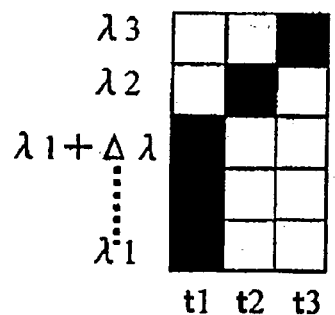
FIG. 11 is a diagram showing an exemplary code pattern in which a wavelength band of a predetermined range is assigned to a single time bin.

FIG. 11 shows an exemplary code pattern for the apparatus of the present embodiment. In the example of FIG. 11, an infinite number of wavelengths within a continuous range from λ1 to λ1+Δλ are assigned to the time bin t1. Although it would similarly be possible to assign a wavelength range of λ2 to λ2′ to the time bin t2 and a wavelength range of λ3 to λ3′ to the time bin t3, FIG. 11 illustrates an example where wavelengths λ2 and λ3 are assigned, for simplicity.

A light pulse which has propagated through an optical fiber 53 is transmitted through a circulator 54 to enter a first optical fiber 55. In the first optical fiber 55, gratings 56, 57 and 58 are disposed in positions corresponding to time bins t1, t2 and t3, respectively. The gratings 57 and 58 each have practically single reflection wavelengths λ2 and λ3, respectively. On the other hand, the grating 56 is a chirped grating having a reflection wavelength band from λ1 to λ1+Δλ. Since a chirped grating has a structure in which the grating period (refractive index modulation period) varies depending on the position along the axial direction, light having any wavelength contained in the band from λ1 to λ1+Δλ will be reflected at different positions in the grating 56, depending on its wavelength. As a result, continuously differing optical path differences (delays) will emerge depending on the wavelength.

In the present embodiment, the reflection wavelength of the grating 56 is based on a chirp structure where the reflection wavelength either monotonously decreases or increases with the distance from the light inputting end of the optical fiber 55. On the other hand, a second optical fiber 59 includes a grating 60 having an opposite chirp structure to the aforementioned chirp structure. By thus arranging the two chirped gratings 56 and 60 in a complementary manner, it is possible to cancel the delays associated with the chirp structures. For example, when a light pulse of the wavelength λ1+Δλ (which is the longest among the wavelengths λ1 to λ1+Δλ) is reflected near the left end of the grating 56, this light pulse will be reflected near the right end of the chirped grating 60 in the second optical fiber 59. On the other hand, a light pulse of the wavelength λ1 (which is the shortest among the wavelengths λ1 to λ1+Δλ) will be reflected near the right end of the grating 56 in the first optical fiber 55, but reflected near the left end of the grating 60 in the second optical fiber 59.

In accordance with the encoder of the present embodiment, light of a multitude of continuously-changing wavelengths is all assigned to a single time bin for performing encoding. Therefore, even if a wavelength shift occurs, it is still possible to perform correct decoding as long as the wavelength λ1 (which is necessary for decoding) is contained in the reflection wavelength band of the chirped grating after a wavelength shift.

Figure 12:
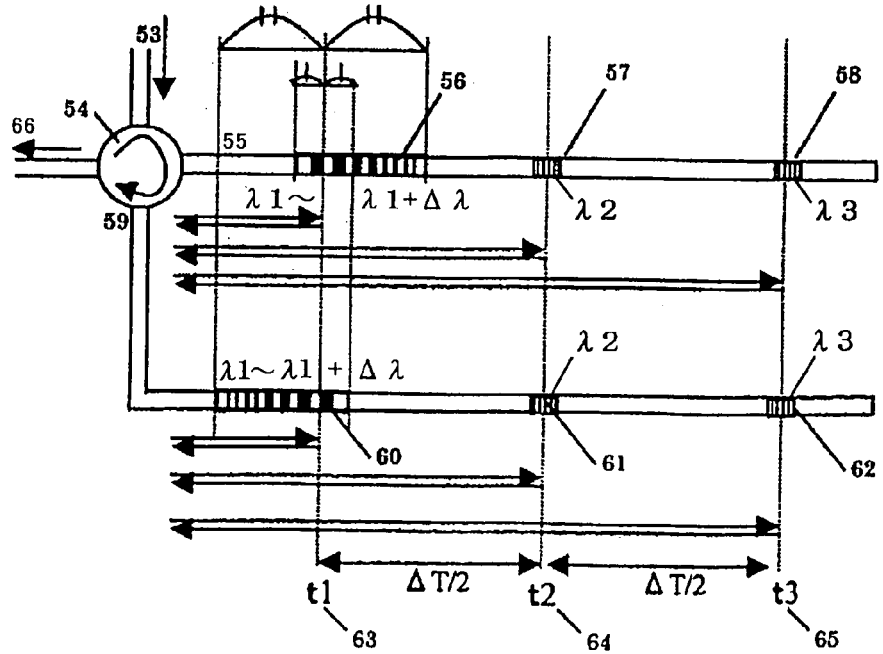
FIG. 12 is a diagram showing the structure of an encoder/decoder according to Embodiment 2 of the present invention.

In accordance with the decoder having the structure of FIG. 12, accurate decoding can be performed regardless of the magnitude of the wavelength shift, as long as the wavelength of an encoded light pulse that is assigned to the time bin t1 is contained in a band from λ1 to λ1+Δλ.

For simplicity, each of the above embodiments illustrates a case where a plurality of wavelengths are assigned only to the time bin t1 and where a plurality of gratings corresponding to the same time bin are disposed only near a central time axis. However, the present invention is not limited to such a structure. A plurality of reflection wavelengths may be assigned to each of the time bins t1, t2 and t3. The number of time bins is not limited to three, but may be four or more.

Embodiment 3

Next, with reference to FIGS. 13 and 14, a third embodiment of the encoder according to the present invention will be described.

Figure 13:
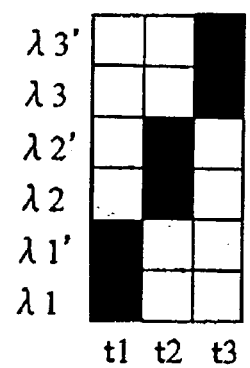
FIG. 13 is a diagram showing another exemplary code pattern in which a plurality of wavelengths are assigned to a single time bin.

In a code pattern shown in FIG. 13, λ1 and λ1' are assigned to a time bin t1; λ2 and λ2' are assigned to a time bin t2; and λ3 and λ3' are assigned to a time bin t3.

Figure 14:
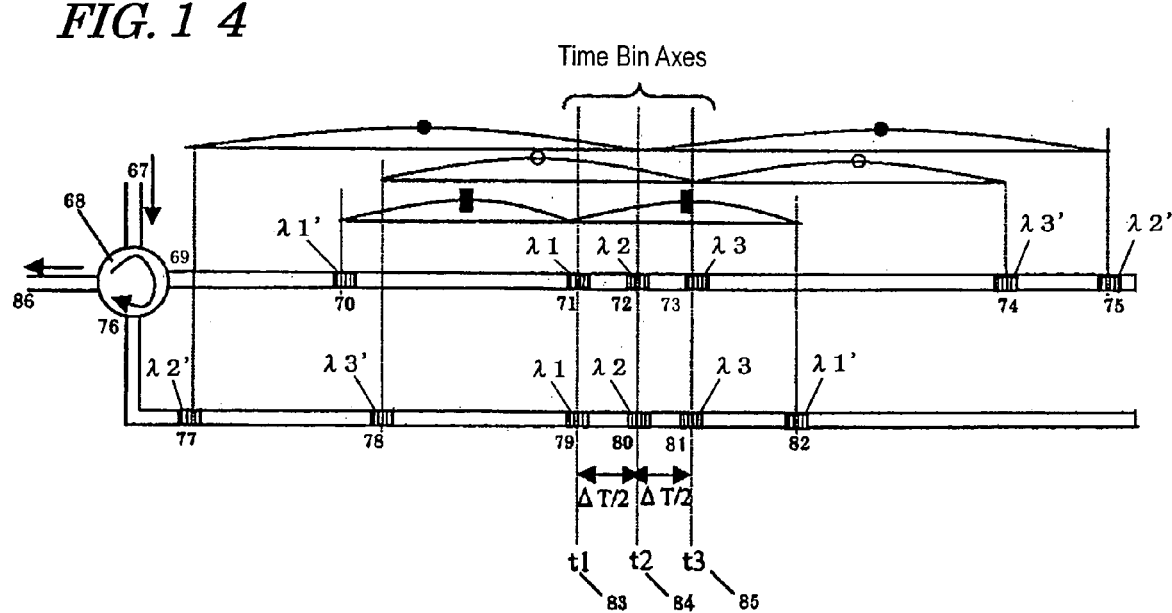
FIG. 14 is a diagram showing the structure of an encoder/decoder according to Embodiment 3 of the present invention.

The encoder of the present embodiment shown in FIG. 14 has a major difference from the encoder of each of the above-described embodiments in that no other grating is inserted between gratings 71, 72, 73, 79, 80 and 81 which are respectively in synchronization with axes 83, 84 and 85 that represent time bins. In the present embodiment, each interval between the axes 83, 84 and 85 is about 0.5 cm, whereas the length of each grating is set to be about 2 cm. Since this structure makes it impossible to adopt the structure shown in FIG. 10 or FIG. 12, the present embodiment adopts the structure of FIG. 14.

In the present embodiment, as shown in FIG. 14, a light pulse which has propagated through an optical fiber 67 is transmitted through a circulator 68 and enters a first optical fiber 69. Light pulses of the corresponding wavelengths are reflected by the gratings 70, 71, 72, 73, 74 and 75, and return to the circulator 68. This sequence of light pulses next enters a second optical fiber 76, and are respectively reflected by the gratings 77, 78, 79, 80, 81 and 82. Thereafter, the light pulses again return to the circulator 68 and output onto an optical fiber 86.

There is no problem in the fact that the other gratings 70, 74, 75, 77, 78 and 82 are far away (toward the left or right) from the axes 83, 84 and 85, as long as they are disposed in such a manner as to mutually cancel delays. For example, the distance from the grating 70 corresponding to the wavelength λ1' to the axis 83 corresponding to the time bin t1 is equal to the distance from the axis 83 to the grating 82 (located opposite from the grating 70) in the second optical fiber 76. As a result, light pulses of the wavelengths λ1' and λ1 will be output in the time bin t1. Similarly, the distance from the grating 75 corresponding to the wavelength λ2' to the axis 84 corresponding to the time bin t2 is equal to the distance from the axis 84 to the grating 77 (located opposite from the grating 75) in the second optical fiber 76. As a result, light pulses of the wavelengths λ2' and λ2 will be output in the same time bin t2. Similarly, the distance from the grating 74 corresponding to the wavelength λ3' to the axis 85 corresponding to the time bin t3 is equal to the distance from the axis 85 to the grating 78 (located opposite from the grating 74) in the second optical fiber 76. As a result, light pulses of the wavelengths λ3' and λ3 will be output in the same time bin t3.

Embodiment 4

Figure 15:
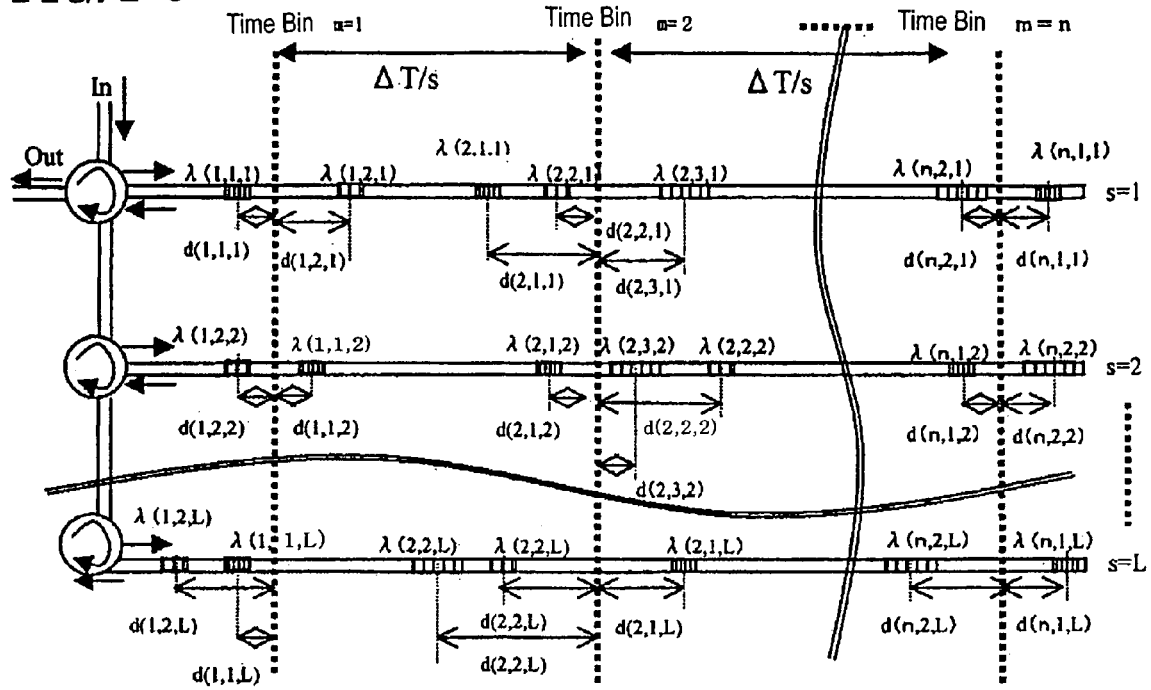
FIG. 15 is a diagram showing the structure of an encoder/decoder according to Embodiment 4 of the present invention.

With reference to FIG. 15, a more generalized structure for the encoder according to the present invention will be described.

The encoder structure of FIG. 15 comprises: L optical fibers (where L is an integer equal to or greater than two) each having gratings formed therein; and a circulator for coupling the L optical fibers. Each of the L optical fibers is represented by an index s ($1 \leq s \leq L$; s is an integer).

Each code pattern to be encoded includes n time bins: time bin 1, time bin 2, . . . time bin n. Herein, n is an integer equal to or greater than two.

Each time bin is identified by an index "m" ($1 \leq m \leq n$; m is an integer). At least one reflection wavelength is assigned to each time bin. A total number of wavelengths that are assigned to a time bin which is identified by the index m ("time bin m") is expressed as a function of m, namely, Q(m). Furthermore, each of the Q(m) wavelengths that are assigned to a time bin m is identified by an index q ($1 \leq q \leq Q(m)$; q is an integer). A wavelength which is identified by the index q is defined as a function of m and q, namely, λ(m, q).

In each optical fiber s ($1 \leq s \leq L$), gratings which respectively correspond to time bins m ($1 \leq m \leq n$) are formed. For a given optical fiber s, a wavelength corresponding to at least one time bin m among the n time bins is identified as λ(m, q1). Furthermore, for a grating which reflects an optical signal of a wavelength λ(m, q1), another grating is formed at a position distant from the position of the former grating, the latter grating belonging to the same time bin m and reflecting an optical signal of a wavelength λ(m, q2) which is different from the wavelength λ(m, q1). Note that q1 and q2 are integers satisfying the following relationships: $1 \leq q1 \leq Q(m)$; $1 \leq q2 \leq Q(m)$; and q1≠q2.

In the optical fiber s, an optical path difference from a grating which reflects an optical signal of the wavelength λ(m, q1) to another grating which reflects an optical signal of the wavelength λ(m, q2) is defined as d(m, q2, s). Herein, a sum of the optical path differences d(m, q2, s) for all of the L optical fibers equals zero. Note that each optical path difference d(m, q2, s) may have a positive or negative polarity. Specifically, the optical path difference d(m, q2, s) is said to have a "negative" polarity if, with respect to a grating which reflects an optical signal of the wavelength λ(m, q1), another grating which reflects an optical signal of the wavelength λ(m, q2) is positioned on the side closer to the circulator (i.e., the input side).

More generally, a reflection wavelength can be expressed as a function of m, q and s, namely, λ(m, q, s). Herein, λ(m, q, s) defines a $q^{th}$ wavelength that is assigned to a time bin m of an $s^{th}$ optical fiber. Furthermore, the distance of a grating which reflects light of a $q^{th}$ wavelength that is assigned to a time bin m of an $s^{th}$ optical fiber, as taken from the position of a vertical axis corresponding to that time bin, can be expressed as d(m,q,s). If the grating is positioned before the axis of the time bin on the optical fiber, d is negative. If the grating is positioned after the axis of the time bin, d is positive.

In the present invention, since a plurality of wavelengths are assigned to a single time bin, gratings having each given reflection wavelength are to be formed in a plurality of optical fibers. If a sum of the distances d of such gratings from the axis of the time bin is calculated for all of the optical fibers, the sum will equal zero, as shown by eq. 1 below.

$$\sum_{s=1}^{L} d(m, q, s) = 0 \quad \text{eq. 1}$$

For example, a grating corresponding to a first wavelength (q=1) that is assigned to a time bin (m=1) shown in FIG. 15 is formed in each of the L optical fibers (s=1 to L). In FIG. 15, this wavelength of light to be reflected in the first two optical fibers (s=1 to 2) is shown ($\lambda$(m=1, q=1, s=1), $\lambda$(m=1, q=1, s=2)) to indicate the positions of the corresponding gratings. In the $L^{th}$ optical fiber, the position of the corresponding grating is shown as $\lambda$(m=1, q=1, s=L).

In FIG. 15, the distance of each of these gratings from the axis of the corresponding time bin is shown as d(m=1, q=1, s=1 to L). Since the grating $\lambda$(1,1,1) is positioned on the left side of the axis of the time bin, its distance d(1, 1, 1) is negative. Since the grating $\lambda$(1, 1, 2) is positioned on the right side of the axis of the time bin, its distance d(1, 1, 2) is positive. If a sum of d(1,1, s=1 to L) is calculated for all of the L optical fibers, the sum will equal zero. Thus, a light pulse having a wavelength (q=1) that is assigned to a time bin (m=1) will have the same delay as that of any other light pulse having a wavelength (q≠1) that is assigned to this time bin (m=1).

Note that, when adopting the structure shown in FIG. 14, the gratings are to be disposed in such a manner that the absolute value of an optical path difference (m, q2, s) for a fiber s is equal to or greater than (n−1) times the minimum pitch of the gratings in the fiber s. Specifically, the minimum pitch of the gratings in the structure of FIG. 14 corresponds to a time period of ΔT/2, and the distance between opposite ends of the group of three gratings 71, 72 and 73 (or 79, 80 and 81) corresponds to a time period of (3−1)×ΔT/2. The interval between the grating corresponding to the wavelength $\lambda$1' and the grating corresponding to the wavelength $\lambda$1 (both of which are assigned to the same time bin t1) is greater than the distance between the opposite ends of the group of three gratings 71, 72 and 73 (or 79, 80 and 81).

(Computer Simulation)

The characteristics of an encoder/decoder according to the present invention were determined through a computer simulation. The result will be described with reference to FIGS. 16 to 18.

Figure 16:
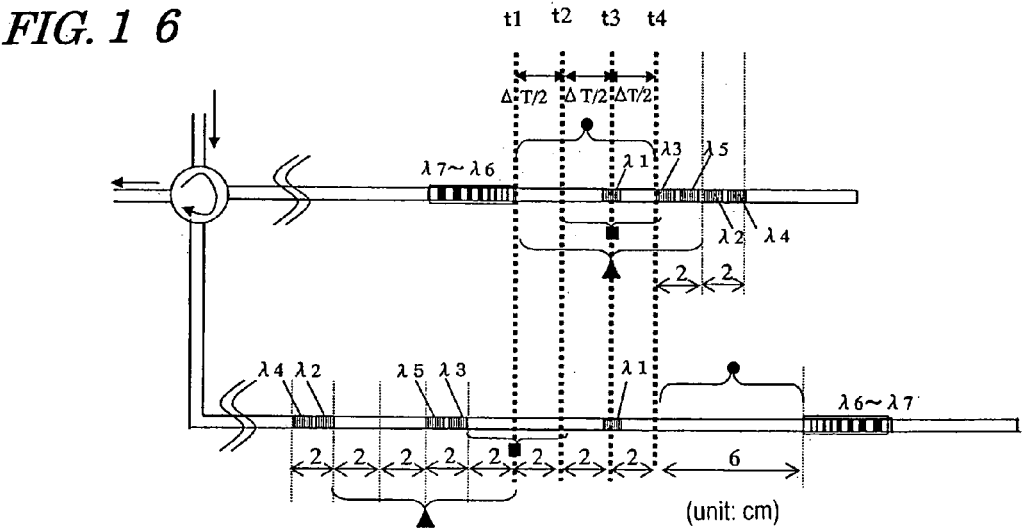
FIG. 16 is a diagram showing the structure of an encoder/decoder for which a computer simulation was performed.
Figure 17:
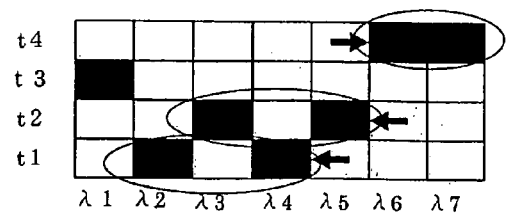
FIG. 17 is a diagram showing an encoding pattern used for the computer simulation.

The simulation was performed with respect to the structure shown in FIG. 16. In the structure of FIG. 16, two optical fibers in which gratings having the reflection wavelengths $\lambda$1, $\lambda$2, $\lambda$3, $\lambda$4, $\lambda$5 and $\lambda$6 to $\lambda$7 are formed are coupled via a circulator. Encoding is performed in accordance with a code pattern shown in FIG. 17. In other words, the wavelengths $\lambda$2 and $\lambda$4 are assigned to the time bin t1; the wavelengths $\lambda$3 and $\lambda$5 are assigned to the time bin t2; the wavelength $\lambda$1 is assigned to the time bin t3; and the wavelengths $\lambda$6 to $\lambda$7 are assigned to the time bin t4. The gratings corresponding to the wavelengths $\lambda$6 to $\lambda$7 have a chirp structure.

In FIG. 16, any value indicative of a length is in the unit of centimeters (cm). Each grating corresponding to the reflection wavelength $\lambda$1, $\lambda$2, $\lambda$3, $\lambda$4 or $\lambda$5 has a length of 1 cm. The grating having a chirp structure has a length of 2 cm.

In accordance with a decoder having the structure of FIG. 16, it is possible to perform decoding regardless of whether a light pulse of the wavelength $\lambda$2 arrives or a light pulse of the wavelength $\lambda$4 arrives with the timing of the time bin t1. In this sense, the decoder functions as an OR operator. With the timing of the time bin t4, encoding is possible when a light pulse having a wavelength which falls within the range from the wavelengths $\lambda$6 to $\lambda$7 arrives.

Figure 18:
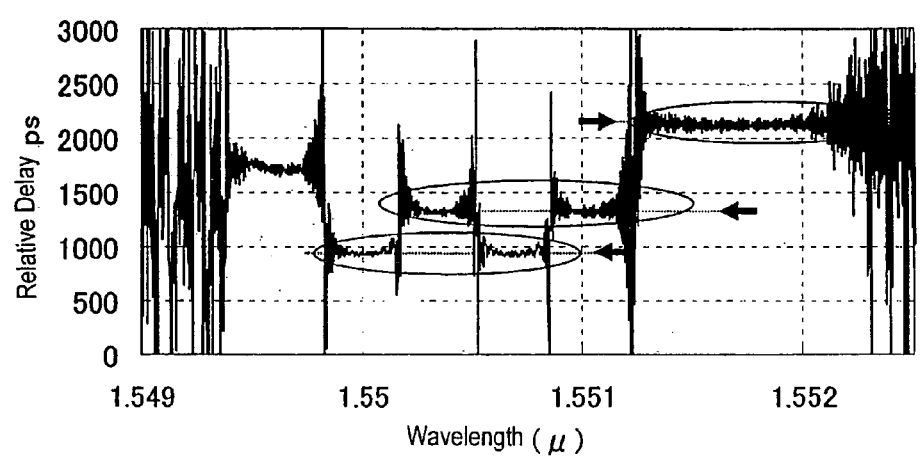
FIG. 18 is a graph showing the result of the computer simulation.

FIG. 18 is a graph showing the simulation result with respect to the apparatus of FIG. 15, representing the relationship between the relative delays of light pulses and the wavelengths. It can be seen that the graph reflects the encoding pattern of FIG. 17, and a plurality of reflection bands having the same relative delay are formed. This indicates that the plurality of wavelengths are assigned to the same time bin.

Embodiment 5

Next, with reference to FIG. 19, a temperature distribution measurement apparatus according to an embodiment of the present invention will be described. As described earlier, by assigning three wavelengths $\lambda$1, $\lambda$4 and $\lambda$5 to the same time bin t1, for example, it becomes possible to perform decoding regardless of whether the wavelength of a light pulse arriving with the timing of the time bin t1 is $\lambda$1, $\lambda$4, or $\lambda$5. The present embodiment utilizes such an OR operator function in realizing a temperature distribution measurement apparatus.

Figure 19:
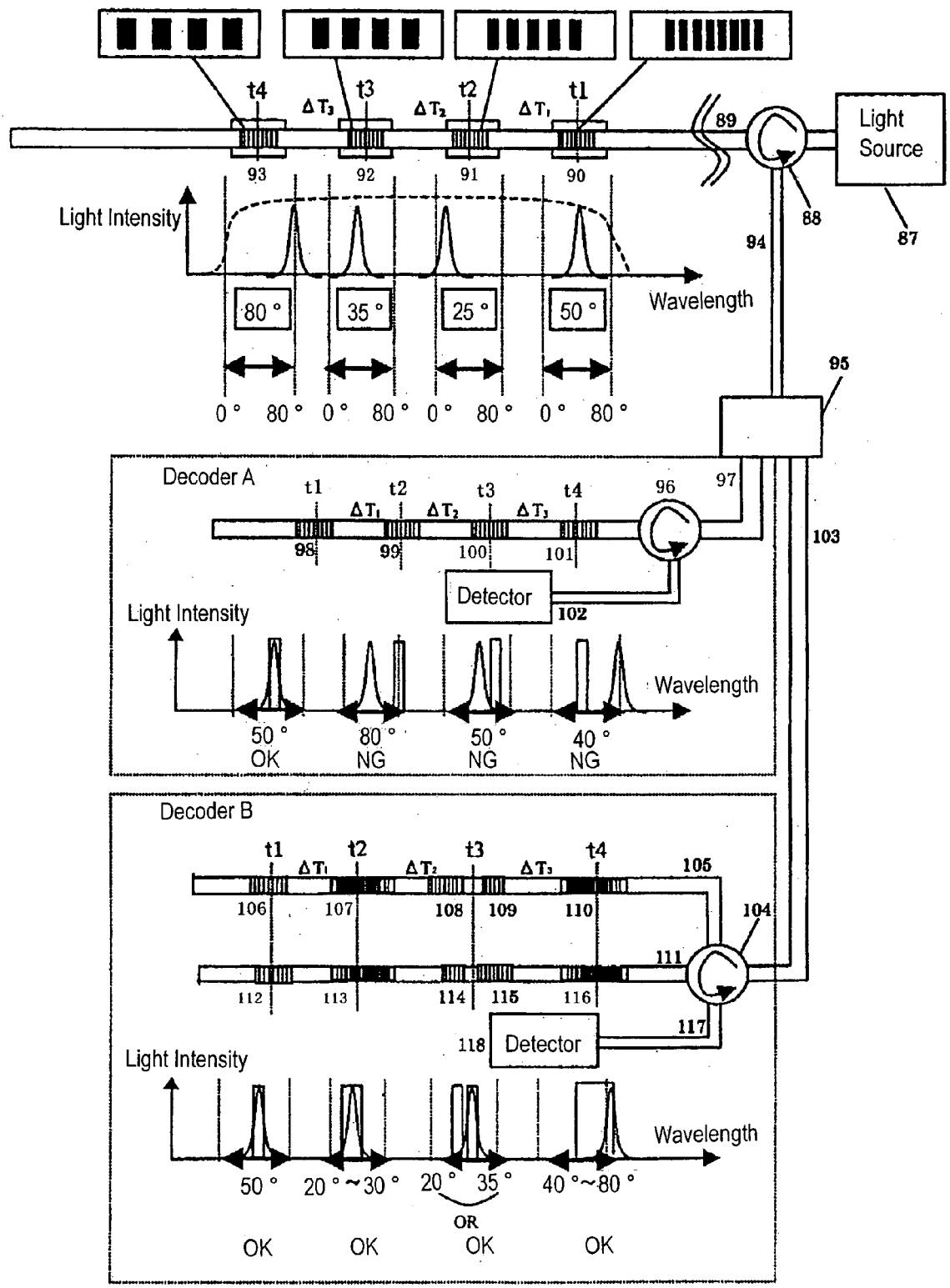
FIG. 19 is a diagram showing the structure of an encoder/decoder according to Embodiment 5 of the present invention.

FIG. 19 shows a temperature distribution detecting apparatus according to the present embodiment. With this temperature detecting apparatus, it can be determined whether a temperature distribution measured at four points coincides with a target temperature distribution or not.

At the four points where temperature measurements are to be taken, gratings 90, 91, 92 and 93 are respectively disposed. Since the reflection wavelengths of the gratings 90, 91, 92 and 93 will be shifted in accordance with the temperatures of the respective points, it is possible to detect a temperature distribution as a whole.

In the present embodiment, by utilizing wavelength shifts associated with changes in temperature, it is determined whether a temperature distribution as measured at the four points matches a predetermined temperature distribution, instead of individually measuring the temperatures of the respective points.

To the gratings whose reflection wavelengths have been shifted in accordance with a given temperature distribution, a broadband light pulse is supplied. As has been described in each of the above embodiments, the light pulse is encoded with a specific encoding pattern, whereby a sequence of light pulses having relative delays is generated.

This light pulse sequence is received at the decoding side, and it is determined whether the light pulse sequence has been encoded in such a manner as to correspond to the encoding pattern of the decoding side. Specifically, if the encoding has been performed so as to correspond to a target temperature distribution, the relative delays in the received light pulse sequence will be cancelled through decoding, so that a pulse having a light intensity which is higher than a certain threshold value will be generated.

In the present embodiment, a code which is in accordance with the distribution of temperatures at the gratings 90, 91, 92 and 93 is generated, and this code is subjected to decoding based on a predetermined encoding pattern, whereby the temperature distribution can be detected.

Next, the operation of the apparatus of FIG. 19 will be described more specifically.

A light source 87 outputs broadband light. This light is input to an optical fiber 89 via a circulator 88. The gratings 90, 91, 92 and 93 are formed in the optical fiber 89. The optical fiber 89 must be laid out so that the gratings 90, 91, 92 and 93 are located at the four points where a temperature distribution is measured.

The number of measurement points is not limited to four, but may be three, or five or more. The grating interval may be arbitrarily determined in accordance with the sizes of the targets of measurement (samples). However, it is necessary that the time intervals between the time bins t1, t2, t3 and t4 coincide with the time intervals between the time bins of the gratings in the decoder.

The reflection wavelength bands of the gratings must be prescribed so that the reflection wavelength bands will not overlap with one another even when the gratings are at the same temperature, and also that the reflection wavelength bands will not overlap with one another even when the reflection band(s) is shifted due to a temperature change within the measurable range of temperatures (e.g., from 0° C. to 80° C.), or a tension change, of any grating. Thus, since the reflection wavelength bands of the gratings 90, 91, 92 and 93 encompass a broad range, it is necessary to prescribe the wavelength range of the light radiated from the light source 87 to be broad enough to cover the entire reflection wavelength bands. For example, in the case where there is a wavelength shift of 0.01 nm/° C. associated with temperature, it is necessary to cover a band which is 4 nm wide.

Now, given a grating number p and a temperature q of that grating, the grating's shifted reflection wavelength may be defined as λp-q. In this case, the reflection wavelengths of the gratings 90, 91, 92 and 93 at a temperature X° C. can be expressed as $\lambda_{1-X}$, $\lambda_{2-X}$, $\lambda_{3-X}$ and $\lambda_{4-X}$, respectively.

In the present embodiment, the entire temperature distribution is expressed as a single code, in the form of an optical signal. The intervals between the four gratings 90, 91, 92 and 93 on the optical fiber correspond to the relative delay times between the reflected light components. By canceling such delay times during decoding, it becomes possible to detect the temperature distribution.

In the example shown in FIG. 19, it is defined that the distance between the gratings 90 and 91 corresponds to a time period of $\Delta T_1$; the distance between the gratings 91 and 92 corresponds to a time period of $\Delta T_2$; and the distance between the gratings 92 and 93 corresponds to a time period of $\Delta T_3$.

Suppose that the temperatures of the gratings 90, 91, 92 and 93 are 50° C., 25° C., 35° C. and 80° C., respectively. The wavelengths of the light which are reflected by the gratings 90, 91, 92 and 93 are $\lambda_{1-50}$, $\lambda_{2-25}$, $\lambda_{3-35}$ and $\lambda_{4-80}$, respectively. If a light pulse is supplied from the light source 87 to the optical fiber in this state, light pulses of the wavelengths $\lambda_{1-50}$, $\lambda_{2-25}$, $\lambda_{3-35}$ and $\lambda_{4-80}$ will return to the circulator 88, with delays reflecting the relative distances between the gratings. The sequence of these light pulses expresses a code which is in accordance with the temperature distribution at the four points.

This light pulse sequence is input to an optical fiber 94 via the circulator 88. Thereafter, by the action of a star coupler 95, some of the light is input to an optical fiber 97 (which leads to decoder A) and the remaining light is input to an optical fiber 103 (which leads to decoder B).

When the encoded light is input from the optical fiber 97 to decoder A, the input light proceeds via a circulator 96 into an optical fiber which has gratings formed therein, and decoded by the gratings. Specifically, the optical fiber has gratings 98, 99, 100 and 101 formed therein, which are arranged in an inverted order of the four gratings 90, 91, 92 and 93. In other words, from the end opposite to the light inputting end, the distance between the gratings 98 and 99 corresponds to a time period of $\Delta T_1$; the distance between the gratings 99 and 100 corresponds to a time period of $\Delta T_2$; and the distance between the gratings 100 and 101 corresponds to a time period of $\Delta T_3$. Thus, as a whole, opposite delays from those applied in the sensor section are applied. Then, the light which has been encoded at the sensor section into light components have relative delays can be restored to a light pulse in which the light components are superposed at the same point in time.

What is important at the decoder side is that the reflection wavelengths of the gratings in the decoder must be prescribed to those reflecting the target temperature distribution. For example, in order to determine whether the temperatures of the points at which the gratings 90, 91, 92 and 93 in the sensor section respectively coincide with 50° C., 80° C., 50° C. and 40° C. or not, the reflection wavelengths of the gratings 98, 99, 100 and 101 of decoder A are set to $\lambda_{1-50}$, $\lambda_{2-80}$, $\lambda_{3-5}$ and $\lambda_{4-40}$, respectively.

When there is maximum correlation between the temperature distribution at the encoding side and the temperature distribution at the decoding side, a high peak of light intensity will be detected by a detector 102. When the correlation is low, the light intensity peak will also be low. On the other hand, in decoder B, each reflection wavelength can be broadened so that decoder B is able to perform an OR operation. Therefore, even if a complete match with the target temperature distribution is not obtained, detection may still be possible. Thus, a broad tolerance can be allowed for the temperature distribution correlation.

The encoder/decoder according to the present invention employs a plurality of optical fibers in which a plurality of gratings having different reflection wavelengths are arranged, thus assigning a plurality of wavelengths to a single time bin. As a result, during encoding/encoding of an optical wavelength-multiplexed signal, immunity is provided against wavelength shifts due to changes in the environment or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An encoder for encoding an optical wavelength-multiplexed signal compliant with optical CDMA into a code having a code pattern, comprising:

L optical fibers (where L is an integer equal to or greater than two) each having a plurality of gratings; and a circulator for coupling the plurality of optical fibers, wherein, the code pattern contains n time bins, including time bin 1, time bin 2, . . . , time bin m, . . . , and time bin n (where n is an integer equal to or greater than two);

the number of wavelengths assigned to a time bin m (where $1 \leq m \leq n$; m is an integer) is defined as Q(m), which is a function of m; among the Q(m) wavelengths assigned to the time bin m, a wavelength identified by an index q (where $1 \leq q \leq Q(m)$; q is an integer) is defined as λ(m, q), which is a function of m and q; and each of the L optical fibers is represented by an index s (where $1 \leq s \leq L$; s is an integer), wherein, in each optical fiber s (where $1 \leq s \leq L$), gratings respectively corresponding to the time bins m (where $1 \leq m \leq n$) are formed, and at a distant position from a position of a grating which reflects an optical signal of a wavelength $\lambda(m, q1)$ corresponding to at least one time bin m included among the n time bins, another grating which belongs to the same time bin m and which reflects an optical signal of a wavelength $\lambda(m, q2)$ (where $1 \leq q1 \leq Q(m)$; $1 \leq q2 \leq Q(m)$; $q1 \neq q2$; q1 and q2 are integers) different from the wavelength $\lambda(m, q1)$ is formed; and in each optical fiber s, an optical path difference from the grating which reflects the optical signal of the wavelength $\lambda(m, q1)$ to the other grating which reflects the optical signal of the wavelength $\lambda(m, q2)$ is defined as d(m, q2, s), wherein a sum of the optical path differences d(m, q2, s) for all of the L optical fibers equals zero.

2. The encoder of claim 1, wherein the reflection wavelength of at least one grating among the plurality of gratings has a continuous distribution covering a predetermined range.

3. The encoder of claim 2, wherein the grating has a chirp structure.

4. The encoder of claim 1, wherein the absolute value of the optical path difference (m, q2, s) in each fiber s is equal to or greater than (n-1) times a minimum pitch of the gratings in the fiber s.

5. A decoder for decoding an optical wavelength-multiplexed signal compliant with optical CDMA, the optical wavelength-multiplexed signal having been encoded with a code pattern, comprising:

L optical fibers (where L is an integer equal to or greater than two) each having a plurality of gratings; and a circulator for coupling the plurality of optical fibers, wherein, the code pattern contains n time bins, including time bin 1, time bin 2, ..., time bin m, ..., and time bin n (where n is an integer equal to or greater than two);

the number of wavelengths assigned to a time bin m (where $1 \leq m \leq n$; m is an integer) is defined as Q(m), which is a function of m; among the Q(m) wavelengths assigned to the time bin m, a wavelength identified by an index q (where $1 \leq q \leq Q(m)$; q is an integer) is defined as $\lambda(m, q)$, which is a function of m and q; and each of the L optical fibers is represented by an index s (where $1 \leq s \leq L$; s is an integer), wherein, in each optical fiber s (where $1 \leq s \leq L$), gratings respectively corresponding to the time bins m (where $1 \leq m \leq n$) are formed, and at a distant position from a position of a grating which reflects an optical signal of a wavelength $\lambda(m, q1)$ corresponding to at least one time bin m included among the n time bins, another grating which belongs to the same time bin m and which reflects an optical signal of a wavelength $\lambda(m, q2)$ (where $1 \leq q1 \leq Q(m)$; $1 \leq q2 \leq Q(m)$; $q1 \neq q2$; q1 and q2 are integers) different from the wavelength $\lambda(m, q1)$ is formed; and in each optical fiber s, an optical path difference from the grating which reflects the optical signal of the wavelength $\lambda(m, q1)$ to the other grating which reflects the optical signal of the wavelength $\lambda(m, q2)$ is defined as d(m, q2, s), wherein a sum of the optical path differences d(m, q2, s) for all of the L optical fibers equals zero.

6. The decoder of claim 5, wherein the reflection wavelength of at least one grating among the plurality of gratings has a continuous distribution covering a predetermined range.

7. The decoder of claim 6, wherein the grating has a chirp structure.

8. The decoder of claim 5, wherein the absolute value of the optical path difference (m, q2, s) in each fiber s is equal to or greater than (n-1) times a minimum pitch of the gratings in the fiber s.

9. A temperature distribution detecting apparatus comprising:

a light source for outputting an optical wavelength-multiplexed signal;

an encoder for encoding the optical wavelength-multiplexed signal, the encoder having an optical fiber in which a plurality of gratings are formed; and the decoder of claim 5 for decoding the optical wavelength-multiplexed signal having been encoded by the encoder, wherein, based on a combination of reflection wavelengths of the plurality of gratings of the decoder, the temperature distribution detecting apparatus determines a temperature distribution of the positions at which the plurality of gratings of the encoders are located.

* * * * *